United States Patent
Cheiky et al.

(10) Patent No.: US 6,682,854 B2
(45) Date of Patent: *Jan. 27, 2004

(54) BATTERY SEPARATOR WITH FLUORIDE-CONTAINING INORGANIC SALT

(75) Inventors: Michael Cheiky, Santa Barbara, CA (US); Wilson Hago, Ventura, CA (US)

(73) Assignee: Zinc Matrix Power, Inc., Santa Barbara, CA (US)

(*) Notice: Subject to any disclaimer, the term of this patent is extended or adjusted under 35 U.S.C. 154(b) by 232 days.

This patent is subject to a terminal disclaimer.

(21) Appl. No.: 09/839,327

(22) Filed: Apr. 19, 2001

(65) Prior Publication Data

US 2002/0182512 A1 Dec. 5, 2002

(51) Int. Cl.[7] .............................. H01M 2/16; H01M 4/54
(52) U.S. Cl. ...................... 429/251; 429/219; 429/248; 429/255

(58) Field of Search ................... 429/206, 219, 429/248, 251, 255; 428/311.71, 311.91, 323, 328, 330

(56) References Cited

U.S. PATENT DOCUMENTS

| | | |
|---|---|---|
| 4,253,927 A | 3/1981 | Bernstein et al. |
| 4,272,470 A | 6/1981 | Hsu et al. |
| 5,302,475 A | 4/1994 | Adler et al. |
| 5,342,659 A | 8/1994 | Horowitz et al. |
| 5,681,672 A | 10/1997 | Lee |
| 5,763,557 A | 6/1998 | Sanduja et al. |
| 2002/0182489 A1 * | 12/2002 | Cheiky et al. ............ 429/144 |

* cited by examiner

*Primary Examiner*—Randy Gulakowski
*Assistant Examiner*—Jonathan Crepeau
(74) *Attorney, Agent, or Firm*—Marvin E. Jacobs

(57) ABSTRACT

Separator for silver-zinc batteries made of cellulose and containing insoluble fluoride ions which when placed next to the cathode slowly release and retard silver deposition thereon.

10 Claims, 1 Drawing Sheet

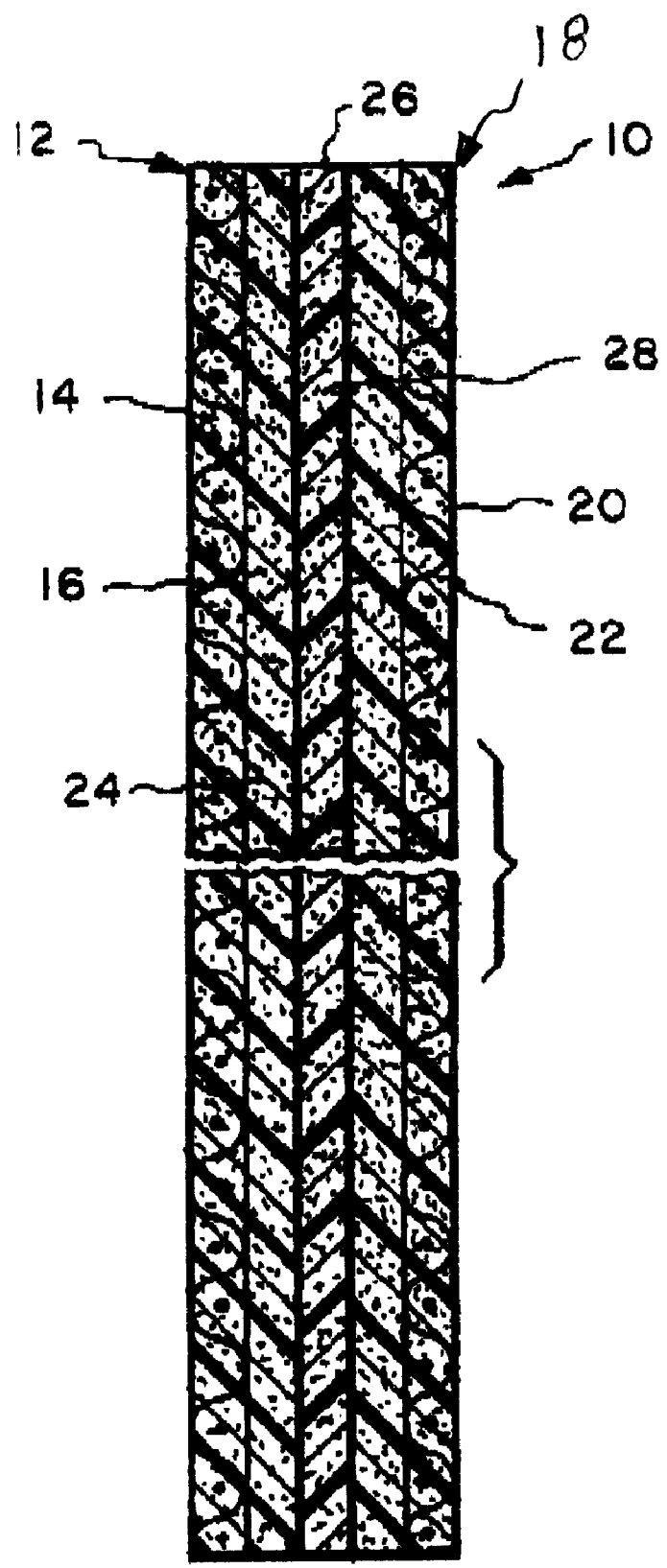

BATTERY SEPARATOR WITH FLUORIDE-CONTAINING INORGANIC SALT

TECHNICAL FIELD

This invention relates to a separator for an alkaline battery and, more particularly for a separator for a zinc-based battery.

BACKGROUND OF THE INVENTION

Separators are a crucial component in alkaline batteries. They keep the positive and negative sides of the battery separate while letting certain ions pass through while blocking other ions. The separator is a passive element that has to perform the same task unchanged for the life of the battery while withstanding a strongly alkaline environment at ambient and elevated temperatures.

For an alkaline battery, a separator should conduct hydroxyl ions at a rate sufficient to meet the high current demands of modern electronics. Films of cellulose in the form of regenerated cellulose have been used since World War II as the separator of choice for this purpose because of the superior ability of cellulose to conduct hydroxyl ion in strongly alkaline media. The low electrical resistance of 10 milliohm-in$^2$ has also contributed to the favor among battery manufacturers for use of cellulose separators in zinc-based batteries, such as silver-zinc, zinc-nickel, and zinc manganese dioxide batteries. Additionally, the separator acts as a physical barrier to migration of other ions in the battery, such as zincate ions and silver ions in a silver-zinc battery.

In the presence of a silver cathode, regenerated cellulose performs a sacrificial role as silver metal is deposited on the separator. This can have a deleterious effect on both the water transport and the ionic conductivity of the membrane.

STATEMENT OF THE PRIOR ART

Limited developments have occurred in the improvement of regenerated cellulose as a battery separator. Regenerated cellulose films are the result of processing of cellulose by a xanthation reaction. Cellophane is manufactured from cellulose having a degree of polymerization between 350 and 500. There have been different attempts to treat the surface of cellophane chemically. In U.S. Pat. No. 5,763,557 Sanduja et al graft a polymer on the surface of a film of cellophane by contacting the film with a solution of silver nitrate and an alkali-metal hydroxide, then contacting a polymerizable monomer and a catalyst, the polymerization taking place directly on the surface molecules of the substrate. Similar techniques are used in U.S. Pat. No. 5,342,659. There is no evidence, however, that surface treatment of cellophane significantly retards silver deposition on the membrane.

U.S. Pat. No. 4,272,470 discloses crosslinked polyvinyl alcohol as a material that is resistant to degradation and suitable for use as a separator for an alkaline battery. The claim is that mixing a film-forming polyvinyl alcohol resin with a polyaldehyde-polysaccharide crosslinking agent will confer resistance against degradation.

Yet another approach has been to integrate wettability onto a film that would otherwise be hydrophobic. Numerous examples abound in this area. For example, U.S. Pat. No. 4,253,927 discloses modifying polyethylene film by grafting carboxyl groups onto the surface of the polyethylene film. The carboxyl groups act as carriers for ionic charge through the separator material. Degradation resistance is provided as long as the degree of grafting is a small fraction of the bulk polymer.

Cellulose, however, provides superior ionic transport to polyolefin films. It would be desirable, therefore, to manufacture a cellulose film that possesses the ability to resist silver deposition while maintaining high ionic transport.

The use of metal fluorides as agents against cellulose degradation has seen little use in alkaline batteries. U.S. Pat. No. 5,681,672 by Lee teaches adding barium fluoride to the electrolyte solution as a remedy for zinc dendrites while Adler et al in U.S. Pat. No. 5,302,475 uses an electrolyte containing KOH and a combination of KF and $K_2CO_3$ salts to inhibit zinc dendrite formation.

STATEMENT OF THE INVENTION

The separator of the present invention retards deposition of silver on its surface. The battery separator of the invention comprises cellulose, optionally a hydrogen permeable hydrophobic polymer, and an inorganic salt, preferably an insoluble fluoride salt that slowly releases from the separator to retard deposition of silver. The fluoride salt should have solubility within the range of 10 $\mu$g/ml to 10 mg/ml and be in a concentration range of 2 to 20% weight of the separator. This separator when placed against the cathode of a silver oxide battery retards silver deposition on the surface of the separator.

Regenerated cellulose films of the invention are resistant to silver deposition. Performance is improved by embedding a slowly dissolving inorganic salt containing fluoride anions within the separator film. The salt purposefully and controllably leaches out of the separator at a small enough rate so as to solubilize silver ions and prevent their deposition on the separator.

These and many other features and attendant advantages of the invention will become apparent as the invention becomes better understood by reference to the following detailed description when considered in conjunction with the accompanying drawings.

BRIEF DESCRIPTION OF THE DRAWINGS

The FIGURE is a cross-sectional view of a zinc-silver battery containing a separator according to the invention.

DETAILED DESCRIPTION OF THE INVENTION

Referring now to the FIGURE of a battery 10 which includes a zinc containing anode 12 formed of a metal screen current collector 14 supporting a layer 16 of anode material and a cathode 18 formed of a cathode layer 20 containing silver supported on a metal screen current collector 22. The anode 12 and cathode 18 are separated by an alkali resistant, hydrogen permeable regenerated cellulose separator 26 containing particles 28 of a fluoride. Additional regenerated separation films 24 may be provided on either or both sides of the separator film 26.

The solubility of silver oxide in water is 13 $\mu$g/ml while that of silver fluoride is 1.82 grams/ml. This huge discrepancy in the solubility of the two salts provides a driving force enabling any silver ions in the neighborhood of the separator to remain in solution.

The encapsulation of the active salt in regenerated cellulose is effected as follows. A solution of cellulose, with a degree of polymerization from 200 to 1200, in the form of, but not limited to, microcrystalline cellulose, cotton fiber, paper and microgranular cellulose, is dissolved using a variety of different solvents, including, but not limited to, LiCl/DMAC, trifluoroacetic acid and N-morpholine N-oxide. With LiCl/DMAC the applicable range is 3 to 8% weight LiCl to DMAC and the applicable range for the percent weight solution of cellulose to solvent is 1 to 11%. The dissolved cellulose may be crosslinked in a variety of ways, including reacting it with an alkyl dihalide.

The hydrogen permeable separator preferably contains hydrogen permeable domains within the regenerated cellulose film. The hydrogen permeable domain material is preferably soluble in a common solvent to cellulose so that the domains form on casting. Suitable hydrogen permeable materials are cellulose ethers in which the ether group contains 2 to 8 carbon atoms and is present in the separator film in an amount from 10 to 60 parts by weight to 100 parts of cellulose.

A fluoride containing salt, in the solubility range of 10 $\mu$g/ml to 10 mg/ml is added to the solution as a suspension. Salts meeting the required criteria include, but are not limited to, calcium fluoride, magnesium fluoride, lead fluoride, barium fluoride, mercury (I) fluoride and strontium fluoride.

The resulting mixture is then cast via conventional methods. These methods are known to those skilled in the art of membrane fabrication. They include extrusion of the solution onto a conveyor belt, casting onto a glass plate with a casting knife or casting onto a well-leveled glass plate.

After casting, the resulting solution is coagulated with conventional techniques, preferably using water as the coagulating agent. Coagulation may be attained either by exposure to ambient moisture or by direct application of a water stream to the resulting solution. The coagulated cellulose material is then washed to remove the solvent and the LiCl salt. The fluoride salt, because of its relatively insolubility, will remain in the gel. It is possible to employ alcohols mixed with water, but it is preferable that they be kept below 50% volume ratio.

After thorough washing of the resulting gel, the gel may be dried by any conventional methods, including air-drying, press-drying, or vacuum-drying.

EXAMPLE 1

100 g of LiCl is dissolved in 2 kg of dimethylacetamide (DMAC) at room temperature. 40 g of microcrystalline cellulose (MCC, Aldrich 31,069-7) is placed in a solution containing 2 kg of LiCl/DMAC solvent and heated to 120 degrees Celsius for 15 minutes. The cooled solution provides a clear solution. The solution is cooled to room temperature and 3.2 g $CaF_2$ is added to the solution. After gelling with ambient moisture, the gel is rinsed with deionized water to remove all solvent and LiCl. The clean gel is placed in a dry-press mount at 105 degress Celsius for 1.5 hours at which point a clear hazy film is obtained.

An experiment was performed to determine the effectiveness of adding a fluoride to the separator film. A film of example 1 was compared to regenerated cellulose in terms of silver plating. Both films were exposed to a 3% aqueous silver nitrate solution for 10 minutes, rinsed several times in distilled water, and then developed in 50% by weight potassium hydroxide for 2 minutes. The latter exposure induces silver plating on the cellulose films. The presence of silver on the separators was detected with a Spectrace Quanx X-ray Fluorescence Analyzer operating at a tube voltage of 40 kv and 0.4 milliampere current. Results are reported in terms of detector count number.

TABLE 1

| CELLOPHANE | 4000 |
|---|---|
| CaF2 DOPED FILM | 2912 |

EXAMPLE 2

40 grams of microcrystalline cellulose (MCC, Aldrich 31,069-7) is placed in a solution of 2 kg of 5% LiCl/DMAC and heated to 120 degrees Celsius for 15 minutes. The cooled solution affords a clear solution of MCC. 26.7 grams of ethyl cellulose (EC) are dissolved in 530 ml DMAC separately. The MCC and EC solutions are combined in a 60/40 weight ratio by polymer weight. To this mixture 3.3 g $CaF_2$ is added and stirred for 15 minutes. 40 ml of the combined solution is placed on a glass tray. A humidifier providing water over the glass tray yields a gelled product containing phases of MCC and EC. This gel is then washed with water repeatedly until all DMAC and LiCl are removed. The gel is then dried with a press-dry, affording a film useful as a separator.

It is to be realized that only preferred embodiments of the invention have been described and that numerous substitutions, modifications and alterations are permissible without departing from the spirit and scope of the invention as defined in the following claims.

What is claimed is:

1. A separator for a metal-silver battery which retards deposition of silver on its surface comprising;

a regenerated cellulose film containing a dispersion of particles of a slowly dissolving fluoride having a solubility from 10 $\mu$g/ml to 10 mg/ml.

2. A separator according to claim 1 in which the fluoride is present in the film in amount from 2 to 20 percent by weight.

3. A separator according to claim 2 in which the fluoride is selected from the group consisting of calcium fluoride, magnesium fluoride, lead fluoride, barium fluoride, mercury fluoride and strontium fluoride.

4. A separator according to claim 1 in which the film has a thickness from 10 to 500 microns.

5. A separator according to claim 1 in which the film is hydrogen permeable.

6. A separator according to claim 5 which the film contains hydrogen permeably domains.

7. A separator according to claim 6 in which the film contains 10 to 50 parts of hydrogen permeable polymer to 100 parts of regenerated cellulose.

8. A separator according to claim 7 in which the hydrogen permeable polymer is cellulose ether in which the ether group contains 2–8 carbon atoms.

9. A separator according to claim 8 in which the polymer is ethyl cellulose.

10. A battery according to claim 1 containing a metal counterelectrode and an alkaline electrolyte laden separator as defined in claim 1.

* * * * *